United States Patent
Selvaraj

(10) Patent No.: US 12,026,340 B1
(45) Date of Patent: Jul. 2, 2024

(54) SYSTEM INCLUDING TOUCHSCREEN DISPLAY COMPUTING DEVICE HAVING ADJUSTABLE SENSITIVITY AND METHOD THEREFOR

(71) Applicant: Rockwell Collins, Inc., Cedar Rapids, IA (US)

(72) Inventor: Suganthi Selvaraj, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/137,262

(22) Filed: Apr. 20, 2023

(51) Int. Cl.
*G06F 3/041* (2006.01)
*G01H 11/00* (2006.01)

(52) U.S. Cl.
CPC ....... *G06F 3/041661* (2019.05); *G01H 11/00* (2013.01); *G06F 3/0412* (2013.01)

(58) Field of Classification Search
CPC .. G06F 3/041661; G06F 3/0412; G01H 11/00
See application file for complete search history.

(56) References Cited

U.S. PATENT DOCUMENTS

| | | | |
|---|---|---|---|
| 8,209,071 B2 | 6/2012 | Ross | |
| 8,825,234 B2 | 9/2014 | Williams et al. | |
| 9,690,426 B1 | 6/2017 | Eichwald | |
| 9,870,093 B2 | 1/2018 | Gannon | |
| 10,503,317 B2 | 12/2019 | Domaradzki et al. | |
| 10,838,554 B2 | 11/2020 | Smith | |
| 10,996,793 B2 | 5/2021 | Henderson et al. | |
| 2011/0187651 A1 | 8/2011 | Whitlow et al. | |
| 2013/0033433 A1 | 2/2013 | Rogers et al. | |
| 2013/0314328 A1 | 11/2013 | Singer et al. | |
| 2015/0002403 A1* | 1/2015 | Dostal | G06F 3/0418 345/173 |
| 2019/0290297 A1* | 9/2019 | Haider | A61B 34/20 |

OTHER PUBLICATIONS

Richard Mole "Propeller Dynamic Balancing", Light Aviation Aug. 2011, Engineering, pp. 26-29.

* cited by examiner

*Primary Examiner* — Robert J Michaud
(74) *Attorney, Agent, or Firm* — Suiter Swantz IP

(57) ABSTRACT

A system includes a touchscreen display computing device including a touchscreen display and at least one processor. The touchscreen display may be communicatively coupled to the at least one processor. The touchscreen display computing device may be installed in a vehicle. The at least one processor may be configured to: receive vibration data from a vibration sensor installed onboard the vehicle; calculate, in real time, at least one slew setting associated with an adjustable sensitivity of the touchscreen display based at least on the vibration data; adjust, in real time, the adjustable sensitivity of the touchscreen display based at least on the at least one slew setting; receive, from a user in real time, a touch input from the touchscreen display using the adjusted adjustable sensitivity; and output an instruction based at least on the touch input.

20 Claims, 2 Drawing Sheets

SYSTEM INCLUDING TOUCHSCREEN DISPLAY COMPUTING DEVICE HAVING ADJUSTABLE SENSITIVITY AND METHOD THEREFOR

BACKGROUND

Currently, aircraft are equipped with advanced electronics. One such system is an electronic display system (EDS) touch screen display in a cockpit, which provides an interface between a pilot and an aircraft. However, current touchscreen displays in such systems are not optimized for different flight conditions. When the aircraft is on the ground, the touch screens may often be too rigid, making it difficult for the pilot to use the touchscreen displays effectively. Similarly, when the aircraft is in the air, the touch screens may be too sensitive for the pilot to interact with the touchscreen displays with confidence.

SUMMARY

In one aspect, embodiments of the inventive concepts disclosed herein are directed to a system. The system includes a touchscreen display computing device including a touchscreen display and at least one processor. The touchscreen display may be communicatively coupled to the at least one processor. The touchscreen display computing device may be installed in a vehicle. The at least one processor may be configured to: receive vibration data from a vibration sensor installed onboard the vehicle; calculate, in real time, at least one slew setting associated with an adjustable sensitivity of the touchscreen display based at least on the vibration data; adjust, in real time, the adjustable sensitivity of the touchscreen display based at least on the at least one slew setting; receive, from a user in real time, a touch input from the touchscreen display using the adjusted adjustable sensitivity; and output an instruction based at least on the touch input.

In a further aspect, embodiments of the inventive concepts disclosed herein are directed to a method. The method may include: receiving, by at least one processor, vibration data from a vibration sensor installed onboard a vehicle, wherein a touchscreen display computing device comprises a touchscreen display and the at least one processor, the touchscreen display communicatively coupled to the at least one processor, the touchscreen display computing device installed in the vehicle; calculating, by the at least one processor in real time, at least one slew setting associated with an adjustable sensitivity of a touchscreen display based at least on the vibration data; adjusting, by the at least one processor in real time, the adjustable sensitivity of the touchscreen display based at least on the at least one slew setting; receiving, by the at least one processor from a user in real time, a touch input from the touchscreen display using the adjusted adjustable sensitivity; and outputting, by the at least one processor, an instruction based at least on the touch input.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
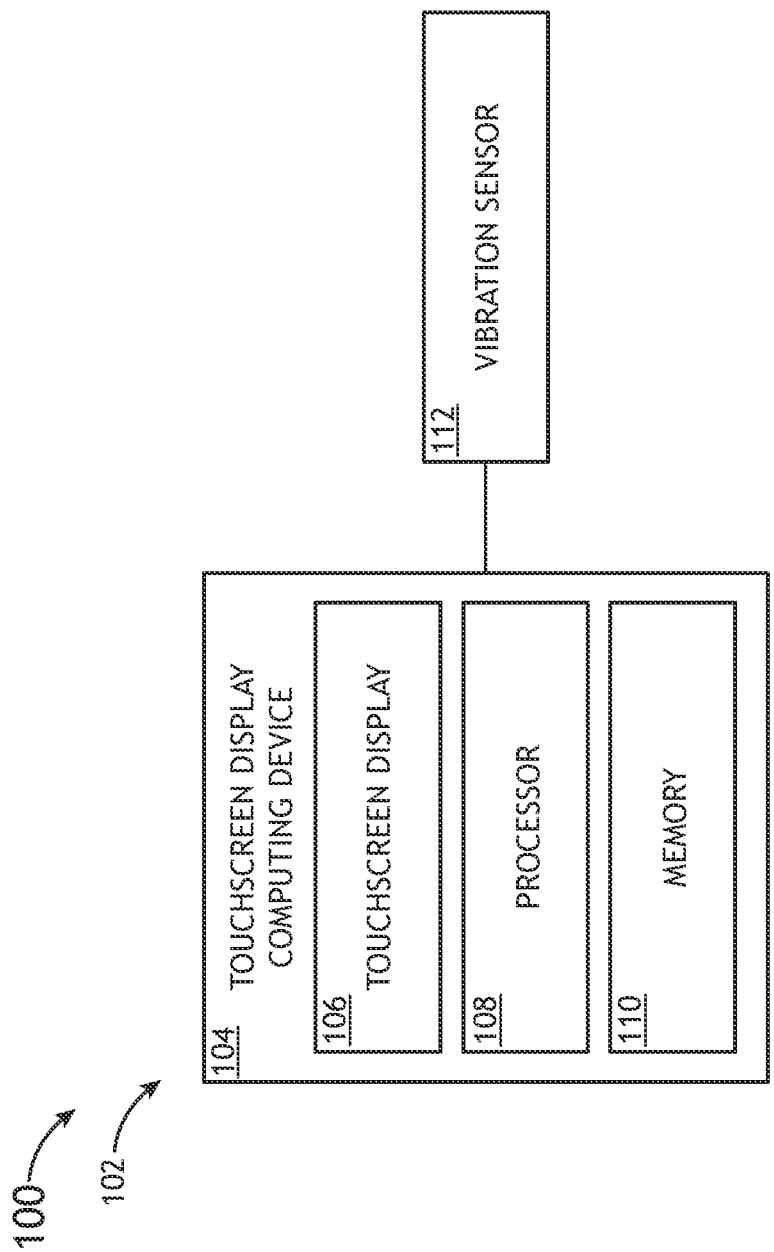
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method for adjusting a sensitivity of a touchscreen display computing device. Some embodiments may include adjusting various settings (e.g., at least one slew setting, at least one pointer speed setting, and/or at least one scrolling speed setting) associated with an adjustable sensitivity of a touchscreen display computing device based on vibration sensor data associated with a vehicle (e.g., an aircraft). Some embodiments may provide a user-friendly and natural-feeling interface for pilots without compromising on safety in different flight conditions.

Some embodiments may include an automatic touchscreen sensitivity feature that adjusts the sensitivity of the touchscreen based on the vibration levels experienced by the aircraft. Some embodiments may provide a user-friendly interface that feels more natural to use in specific flight conditions. In some embodiments, the sensitivity adjustment is accomplished through a formula that adjusts the slew, pointer speed, scrolling speed and/or other sensitivity parameters based on the vibration levels. Slew may refer to the rate at which the touchscreen registers changes in position or movement of a finger or stylus on touchscreen's surface. Such parameters may be adjusted according to a level of vibration sensed by a vibration sensor in the flight deck. For example, any of various suitable relationships may be used to adjust parameters according to a level of vibration. For example, such relationships may include a linear relationship and/or a non-linear relationship (e.g., a quadratic relationship or an exponential relationship).

For example, slew may have an adjustable start delta setting (e.g., start delta threshold) and/or an adjustable stop delta setting (e.g., stop delta threshold).

For example, the slew start delta setting may have an linear relationship as defined by the following equation:

$$\text{slew start delta setting} = m \times \text{Vibration (in IPS)} + c,$$
where $m$ and $c$ are predetermined constants.

For example, the slew start delta setting may have a quadratic relationship as defined by the following equation:

$$\text{slew start delta setting} = a \times (\text{Vibration (in IPS)})^2 + b \times \text{Vibration (in IPS)} + c, \text{ where } a, b, \text{ and } c \text{ are predetermined constants.}$$

For example, the slew start delta setting may have an exponential relationship as defined by the following equation:

$$\text{slew start delta setting} = a \times b^{(\text{Vibration (in IPS)})} + c, \text{ where } a, b, \text{ and } c \text{ are predetermined constants.}$$

For example, in some embodiments, each of the adjustable stop delta setting (e.g., stop delta threshold), the pointer speed, the scrolling speed, and/or other sensitivity parameters, may have a (e.g., same or different) relationship (e.g., a linear relationship and/or a non-linear relationship (e.g., a quadratic relationship or an exponential relationship)) as the slew start delta setting, such as exemplarily provided by the above equations.

For example, when the aircraft is on the ground and experiencing low vibration levels, the touch screen may feel more like a smartphone, requiring less pressure to make selections. Additionally, for example, when the aircraft is in the air and experiencing higher vibration levels, the touch screen may feel more like a multi-functional keyboard panel, requiring more pressure to make selections.

In some embodiments, vibration data may include information about vibrations according to the ACES scale. For example, vibrations may be measured on a severity scale that ranges from 0 to 1.25 IPS (inches per second). The severity of the vibration levels experienced by the aircraft can provide an input for the automatic touch screen sensitivity adjustment. For example, according to the ACES scale, 0-0.07 IPS is considered "good"; 0.07-0.15 IPS is considered "fair"; 0.15-0.25 IPS is considered "slightly rough"; 0.25-0.5 IPS is considered "rough"; 0.5-1.0 IPS is considered "very rough"; and 1.0-1.25 IPS is considered "dangerous".

In some embodiments, by adjusting the sensitivity of the touchscreen based on the vibration levels experienced by the aircraft, pilots may have a more intuitive and user-friendly interface in different flight conditions. Some embodiments may improve safety, efficiency, and overall satisfaction for pilots using such touchscreen displays.

In some embodiments, a touchscreen display computing device installed in the aircraft may be configured to execute a flight display systems application, wherein execution of such application may perform calculations described above based on the vibration data received from a vibration sensor in the flight deck and may automatically adjust, in real time, adjustable sensitivity of the touchscreen display based at least on the calculated settings.

Referring now to FIG. 1, an exemplary embodiment of a system according to the inventive concepts disclosed herein is depicted. In some embodiments, the system may include a vehicle (e.g., an aircraft 100, a train, a spacecraft, or an automobile). The aircraft 100 may include at least one user (e.g., passengers, pilots, and/or crew), a cockpit 102, at least one touchscreen display computing device 104, and/or at least one vibration sensor 112, some or all of which may be communicatively coupled at any given time. The cockpit 102 may include some or all of the touchscreen display computing devices 104 and/or vibration sensor 112. In some embodiments, the at least one touchscreen display computing device 104 and the at least one vibration sensor 112 may be implemented as a single computing device or any number of computing devices configured to perform (e.g., collectively perform if more than one computing device) any or all of the operations disclosed throughout.

The touchscreen display computing device 104 may include any number of display(s) installed in the aircraft 100 and may be implemented as any suitable display device(s). Each touchscreen display computing device 104 may include at least one touchscreen display 106, at least one processor 108, and/or memory 110, some or all of which may be communicatively coupled. For example, the at least one processor 108 may include at least one central processing unit (CPU), at least one graphics processing unit (GPU), at least one field-programmable gate array (FPGA), at least one application specific integrated circuit (ASIC), at least one digital signal processor, at least one deep learning processor unit (DPU), at least one virtual machine (VM) running on at least one processor, and/or the like configured to perform (e.g., collectively perform) any of the operations disclosed throughout. For example, the at least one processor 108 may include a CPU and a GPU configured to perform (e.g., collectively perform) any of the operations disclosed throughout. The processor 108 may be configured to run various software applications (e.g., a flight display systems application) or computer code stored (e.g., maintained) in a non-transitory computer-readable medium (e.g., memory 110 and/or storage) and configured to execute various instructions or operations. For example, the at least one processor 108 may be configured (e.g., collectively configured) to: receive vibration data from a vibration sensor installed onboard the vehicle; calculate, in real time, at least one slew setting, at least one pointer speed setting, and/or at least one scrolling speed setting associated with an adjustable sensitivity of the touchscreen display based at least on the vibration data; adjust, in real time, the adjustable sensitivity of the touchscreen display based at least on the at least one slew setting, the at least one pointer speed setting, and/or the at least one scrolling speed setting; receive, from a user in real time, a touch input from the touchscreen display using the adjusted adjustable sensitivity; and/or output an instruction based at least on the touch input. The processor 108 may be configured to perform any or all of the operations disclosed throughout.

For example, each of the at least one slew setting, the at least one pointer speed setting, and/or the at least one scrolling speed setting may have a same or different relationship, such as a linear relationship or a non-linear relationship (e.g., a quadratic relationship or an exponential relationship), with the vibration data.

Figure 2:
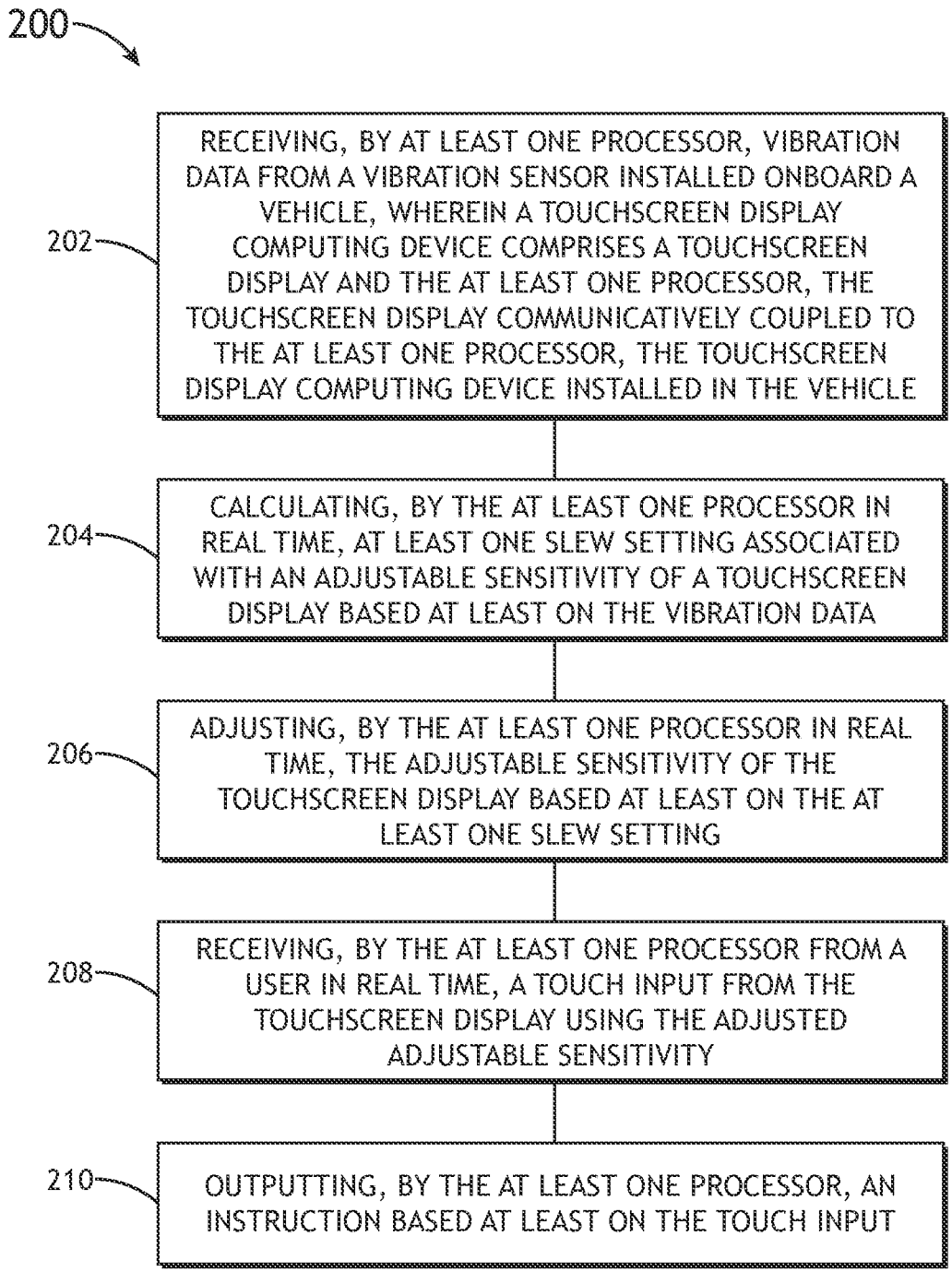
FIG. 2 is a diagram of an exemplary embodiment of a method according to the inventive concepts disclosed herein.

Referring now to FIG. 2, an exemplary embodiment of a method 200 according to the inventive concepts disclosed herein may include one or more of the following steps. Additionally, for example, some embodiments may include performing one or more instances of the method 200 iteratively, concurrently, and/or sequentially. Additionally, for example, at least some of the steps of the method 200 may be performed in parallel and/or concurrently. Additionally, in some embodiments, at least some of the steps of the method 200 may be performed non-sequentially.

A step 202 may include receiving, by at least one processor, vibration data from a vibration sensor installed onboard a vehicle, wherein a touchscreen display computing device comprises a touchscreen display and the at least one processor, the touchscreen display communicatively coupled to the at least one processor, the touchscreen display computing device installed in the vehicle.

A step 204 may include calculating, by the at least one processor in real time, at least one slew setting associated with an adjustable sensitivity of a touchscreen display based at least on the vibration data.

A step 206 may include adjusting, by the at least one processor in real time, the adjustable sensitivity of the touchscreen display based at least on the at least one slew setting.

A step 208 may include receiving, by the at least one processor from a user in real time, a touch input from the touchscreen display using the adjusted adjustable sensitivity.

A step 210 may include outputting, by the at least one processor, an instruction based at least on the touch input.

Further, the method 200 may include any of the operations disclosed throughout.

As will be appreciated from the above, embodiments of the inventive concepts disclosed herein may be directed to a system and a method for adjusting a sensitivity of a touchscreen display computing device.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a touchscreen display computing device comprising a touchscreen display and at least one processor, the touchscreen display communicatively coupled to the at least one processor, the touchscreen display computing device installed in a vehicle, the at least one processor configured to:
receive vibration data from a vibration sensor installed onboard the vehicle;
calculate, in real time, at least one slew setting associated with an adjustable sensitivity of the touchscreen display based at least on the vibration data;

adjust, in real time, the adjustable sensitivity of the touchscreen display based at least on the at least one slew setting;

receive, from a user in real time, a touch input from the touchscreen display using the adjusted adjustable sensitivity; and output an instruction based at least on the touch input.

2. The system of claim 1, wherein the at least one slew setting has a linear relationship, a quadratic relationship, or an exponential relationship with the vibration data.

3. The system of claim 1, wherein the at least one slew setting has a linear relationship with the vibration data.

4. The system of claim 1, wherein the at least one slew setting has a non-linear relationship with the vibration data.

5. The system of claim 4, wherein the non-linear relationship is a quadratic relationship.

6. The system of claim 4, wherein the non-linear relationship is an exponential relationship.

7. The system of claim 1, wherein the vehicle is an aircraft.

8. The system of claim 7, wherein the touchscreen display computing device is installed in a cockpit of the aircraft, wherein the user is a pilot.

9. The system of claim 1, wherein the at least one processor is further configured to: calculate, in real time, a pointer speed setting associated with the adjustable sensitivity of the touchscreen display based at least on the vibration data;

and adjust, in real time, the adjustable sensitivity of the touchscreen display based at least on the pointer speed setting.

10. The system of claim 9, wherein the pointer speed setting has a linear relationship, a quadratic relationship, or an exponential relationship with the vibration data.

11. The system of claim 9, wherein the pointer speed setting has a linear relationship with the vibration data.

12. The system of claim 9, wherein the pointer speed setting has a non-linear relationship with the vibration data.

13. The system of claim 9, wherein the vehicle is an aircraft, wherein the touchscreen display computing device is installed in a cockpit of the aircraft, wherein the user is a pilot, wherein the at least one processor is further configured to:

calculate, in real time, a scrolling speed setting associated with the adjustable sensitivity of the touchscreen display based at least on the vibration data; and adjust, in real time, the adjustable sensitivity of the touchscreen display based at least on the scrolling speed setting.

14. The system of claim 13, wherein each of the at least one slew setting, the scrolling speed setting, and the pointer speed setting has a linear relationship, a quadratic relationship, or an exponential relationship with the vibration data.

15. The system of claim 13, wherein each of the at least one slew setting, the scrolling speed setting, and the pointer speed setting has a non-linear relationship with the vibration data.

16. The system of claim 1, wherein the at least one processor is further configured to: calculate, in real time, a scrolling speed setting associated with the adjustable sensitivity of the touchscreen display based at least on the vibration data, and adjust, in real time, the adjustable sensitivity of the touchscreen display based at least on the scrolling speed setting.

17. The system of claim 16, wherein the scrolling speed setting has a linear relationship, a quadratic relationship, or an exponential relationship with the vibration data.

18. The system of claim 16, wherein the scrolling speed setting has a linear relationship with the vibration data.

19. The system of claim 16, wherein the scrolling speed setting has a non-linear relationship with the vibration data.

20. A method, comprising:

receiving, by at least one processor, vibration data from a vibration sensor installed onboard a vehicle, wherein a touchscreen display computing device comprises a touchscreen display and the at least one processor, the touchscreen display communicatively coupled to the at least one processor, the touchscreen display computing device installed in the vehicle;

calculating, by the at least one processor in real time, at least one slew setting associated with an adjustable sensitivity of a touchscreen display based at least on the vibration data;

adjusting, by the at least one processor in real time, the adjustable sensitivity of the touchscreen display based at least on the at least one slew setting;

receiving, by the at least one processor from a user in real time, a touch input from the touchscreen display using the adjusted adjustable sensitivity; and outputting, by the at least one processor, an instruction based at least on the touch input.

* * * * *